Oct. 31, 1950     V. R. MacFEE     2,527,750
FERTILIZER DISTRIBUTOR
Filed Oct. 12, 1946
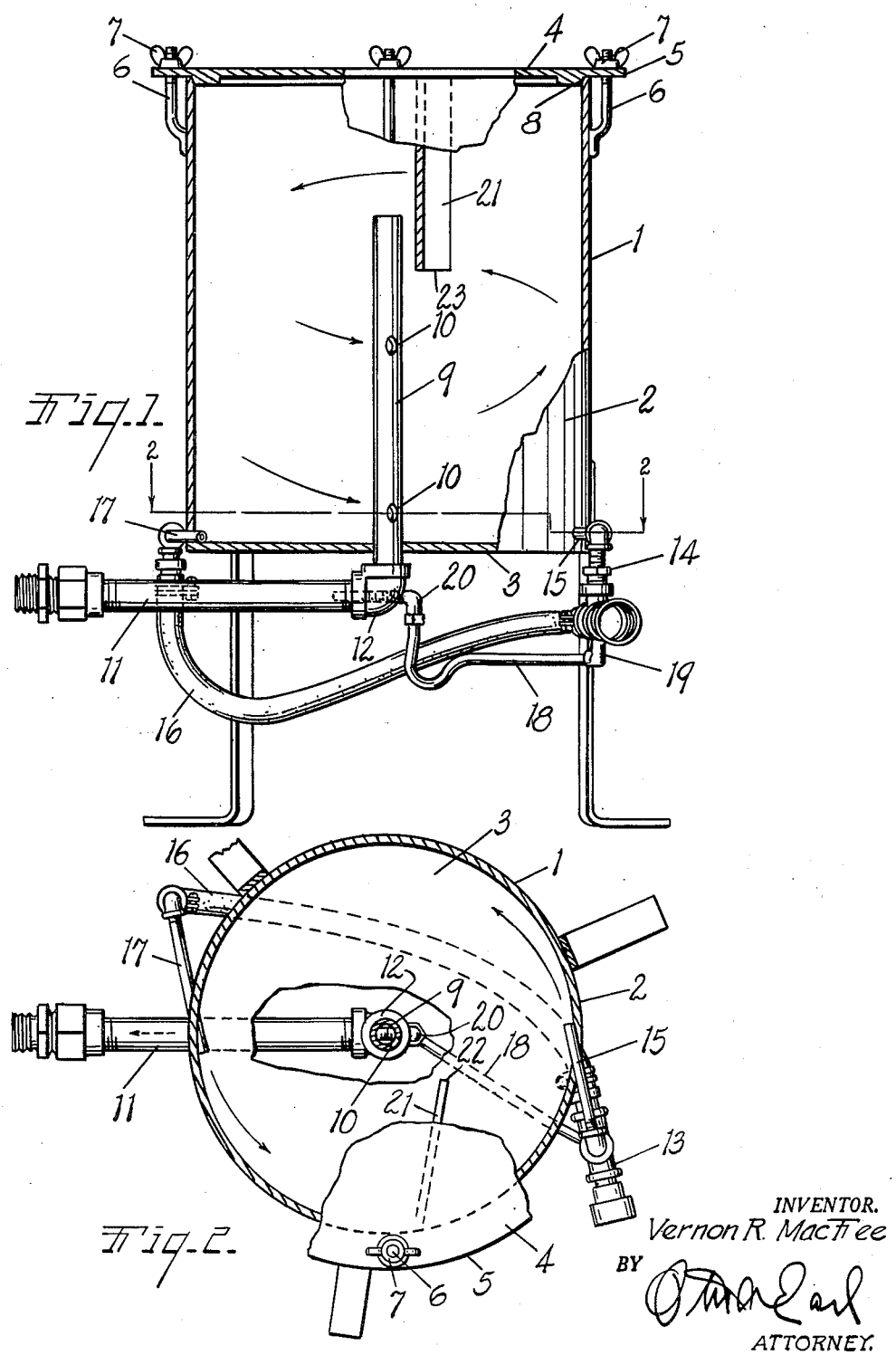
INVENTOR.
Vernon R. MacFee
BY
ATTORNEY.

Patented Oct. 31, 1950

2,527,750

UNITED STATES PATENT OFFICE 2,527,750

FERTILIZER DISTRIBUTOR

Vernon R. MacFee, Doster, Mich.

Application October 12, 1946, Serial No. 702,904

7 Claims. (Cl. 47—1)

This invention relates to improvements in fertilizer distributor.

The main objects of this invention are:

First, to provide a fertilizer distributor which may be used as an attachment to a garden hose for distributing fertilizer on lawns, gardens, and the like.

Second, to provide a fertilizer distributor which is adapted for use with soluble or relatively soluble fertilizing material or partially soluble fertilizing material without becoming clogged.

Third, to provide a fertilizer distributor in which the common forms of commercial fertilizer may be used and the fertilizer quite uniformly distributed with the exercise of a little care regarding the portions thereof which are not easily soluble.

Fourth, to provide an apparatus of this character which is of substantial capacity and at the same time quite compact and light for convenience in handling.

Further objects relating to details and economies of the invention will be apparent from the following description. The invention is defined and pointed out in the claims.

A structure which embodies the features of the invention is illustrated in the accompanying drawing, in which:

Fig. 1 is a fragmentary view of a tank mainly in vertical central section of a structure embodying my invention.

Fig. 2 is a fragmentary view mainly in horizontal section on line 2—2 of Fig. 1, parts being shown in full lines for convenience in illustration.

In the accompanying drawing the tank, designated generally by the numeral 1, has a cylindrical side wall 2, flat bottom 3, and a removable cover 4. The cover is provided with a projecting flange 5 adapted to receive the attaching bolts 6 which are welded to the outer side of the tank's side wall to project upwardly therefrom through the flange 5, thumb nuts 7 being provided for clamping the cover in closed position. The cover has an internal flange 8 fitting within the upper end of the tank's side wall.

The outlet or eduction pipe 9 is secured to the bottom of the tank projecting upwardly therethrough. This outlet pipe 9 is disposed centrally within the tank and terminates in spaced relation to the top. The upper end of the outlet pipe is open and it desirably has vertically spaced side openings 10.

The delivery pipe 11 is connected to the bottom or outlet pipe 9 by means of the elbow coupling 12. The delivery pipe is adapted at its outer end to receive a hose not illustrated.

The inlet pipe 13 is adapted to be connected to a hose or other source of water supply and has a branch 14 connecting to the nozzle 15 and a second branch 16 in the embodiment illustrated in the form of a section of hose of relatively small diameter connected to the nozzle 17. The nozzles 15 and 17 are sections of relatively small diameter pipe or tubing. The nozzle 15 is arranged to deliver tangentially within the tank adjacent the bottom thereof. This sets up a circulatory or whirling motion within the tank.

A by-pass conduit 18 also formed of a section of tubing is connected to the water supply conduit at 19 and to the elbow 12, the coupling 20 being threaded into the elbow to deliver longitudinally of the delivery pipe 11. The baffle 21 is disposed at the top of the tank to project inwardly from the side wall thereof and desirably at an angle as shown in Fig. 2 so that its inner vertical edge 22 is adjacent but spaced from the outlet pipe.

The purpose of the baffle is to direct the whirling water at the upper end of the tank toward the outlet pipe. The lower edge 23 of the baffle extends somewhat below the upper end of the pipe as is shown in Fig. 2. The combined flow capacity of the nozzles is substantially restricted relative to the supply capacity of the supply conduit and the flow capacity of the nozzles and the by-pass is substantially less than the capacity of the delivery pipe. This avoids back pressure within the tank which would prevent the desired circulatory or whirling motion of the fluid and also the relatively restricted capacity of the nozzles results in the water being projected at relatively high speed or in the form of jets, which quickly sets up a whirling circulatory motion of the water in the tank to agitate the fertilizer which has been placed therein and keep it in circulation, preventing its settling down into a more or less solid mass which would result in the clogging of the apparatus or detract from its efficiency.

The by-pass serves the double purpose of delivering a jet of water at a point where it is effectively mixed with the water and fertilizer discharged through the outlet pipe 9 and also prevents clogging of the delivery pipe at the elbow and it further acts as an ejector to draw the water and fertilizer material in suspension therein through the outlet pipe 9.

I have not illustrated inlet or outlet control valves, as the particular apparatus illustrated is, as stated, designed for use with hose connections. The supply pipe would ordinarily be connected to the sill cock by a suitable length of hose and the outlet or delivery pipe is ordinarily controlled by the spray nozzle. It will be appreciated, however, that the apparatus might be permanently positioned and connected to a source of water supply where for example the apparatus is used for home or domestic purposes. The portable tank, however, has a wide range of uses.

I have illustrated my invention in a compact, portable type of apparatus. It is believed that the disclosures made will enable those skilled in the art to adapt or embody the invention as may be desired.

Having thus described my invention, what I claim as new and desire to secure by Letters Patent is:

1. In a fertilizer distributor the combination of an upright tank comprising, a bottom, cylindrical side walls, and a removable cover, of an outlet pipe disposed through the bottom to project centrally into the tank, said outlet pipe being open at its upper end and having vertically spaced side openings, a delivery pipe adapted to receive a hose at its outer end disposed horizontally below the tank and having an elbow coupling connection to the lower end of the outlet pipe, a water supply conduit mounted on said tank and adapted to receive a hose at its outer end, nozzles connected to said water supply conduit and positioned to deliver within said tank adjacent its bottom and tangentially of the side walls thereof, the nozzles acting to set up a whirling motion within the tank, the combined flow capacity of the nozzles being restricted relative to the supply capacity of the supply conduit, a nozzle by-pass conduit connecting said water supply conduit to said elbow coupling directed to discharge longitudinally of said delivery pipe, and a baffle disposed at the top of the tank to project inwardly from the side wall thereof with its inner side edge adjacent to the upper end of the outlet pipe but spaced therefrom, and its lower edge projecting below the same to direct the whirling water at the top of the tank toward the outlet pipe, the combined capacity of the nozzles and the by-pass being substantially less than the capacity of the delivery pipe whereby agitating circulation is maintained within the tank.

2. In a fertilizer distributor the combination of an upright tank comprising a bottom, cylindrical side walls, and a removable cover, of an outlet pipe disposed through the bottom to project centrally into the tank, a delivery pipe adapted to receive a hose at its outer end disposed horizontally below the tank and having an elbow coupling connection to the lower end of the outlet pipe for passage of water therethrough from the outlet pipe to the delivery pipe, a water supply conduit mounted on said tank and adapted to receive a hose at its outer end, nozzles connected to said water supply conduit and positioned to deliver within said tank adjacent its bottom and tangentially of the side walls thereof, the nozzles acting to set up a whirling motion within the tank, the combined flow capacity of the nozzles being restricted relative to the supply capacity of the supply conduit, a nozzle by-pass conduit connecting said water supply conduit to said elbow coupling directed to discharge longitudinally of said delivery pipe and substantially parallel to and with the direction of flow in said pipe, the combined capacity of the nozzles and the by-pass being substantially less than the capacity of the delivery pipe whereby agitating circulation is maintained within the tank.

3. In a fertilizer distributor the combination of an upright tank comprising, a bottom, cylindrical side walls, and a removable cover, of an outlet pipe disposed through the bottom to project centrally into the tank, said outlet pipe being open at its upper end and having vertically spaced side openings, a delivery pipe adapted to receive a hose at its outer end disposed horizontally below the tank and connected to the lower end of the outlet pipe for passage of water therethrough from said outlet pipe, a water supply conduit mounted on said tank and adapted to receive a hose at its outer end, a nozzle connected to said water supply conduit and positioned to deliver within said tank adjacent its bottom and tangentially of the side walls thereof, a nozzle by-pass conduit connecting said water supply conduit to said delivery pipe and directed to discharge longitudinally thereof substantially parallel to and with the direction of flow therein, and a baffle disposed at the top of the tank to project inwardly from the side wall thereof with its inner side adjacent to the upper end of the outlet pipe but spaced therefrom, and its lower edge projecting below the same to direct the whirling water at the top of the tank toward the outlet pipe.

4. In a fertilizer distributor the combination of an upright tank comprising, a bottom, cylindrical side walls, and a removable cover, of an outlet pipe disposed through the bottom to project upwardly into the tank, a delivery pipe adapted to receive a hose at its outer end disposed horizontally below the tank and connected to the lower end of the outlet pipe for passage of water therethrough from said outlet pipe, a water supply conduit mounted on said tank and adapted to receive a hose at its outer end, a nozzle connected to said water supply conduit and positioned to deliver within said tank adjacent its bottom and tangentially of the side walls thereof, and a nozzle by-pass conduit connecting said water supply conduit to said delivery pipe and directed to discharge longitudinally thereof substantially parallel to and with the direction of flow therein.

5. In a fertilizer distributor, the combination of a closable tank adapted to receive fertilizing material, of an outlet pipe projecting centrally into the tank from the bottom thereof, said outlet pipe being open at its upper end and having vertically spaced side openings, a delivery pipe connected to the lower end of the outlet pipe, a water supply conduit, nozzles connected to said water supply conduit and positioned to deliver within said tank adjacent its bottom and tangentially of its side walls, and coacting to set up a whirling motion within the tank, the combined flow capacity of the nozzles being restricted relative to the supply capacity of the supply conduit, a nozzle by-pass conduit connecting said water supply conduit to said delivery pipe to discharge longitudinally thereof, and a baffle disposed at the top of the tank to project inwardly from the side wall thereof with its inner side edge adjacent to the upper end of the outlet pipe but spaced therefrom, and its lower edge projecting below the same to direct the whirling water at the top of the tank toward the outlet pipe, the combined capacity of the nozzles and the by-pass being substantially less than the capacity of the delivery pipe whereby agitating circulation is maintained within the tank.

6. In a fertilizer distributor, the combination of a closable tank adapted to receive fertilizing material, of an outlet pipe projecting upwardly into the tank from the bottom thereof, a delivery pipe connected to the lower end of the outlet pipe for passage of water therethrough from said outlet pipe, a water supply conduit, a nozzle connected to said water supply conduit and positioned to deliver within said tank adjacent its bottom and tangentially of its side walls directed to set up a whirling motion within the tank, the flow capacity of the nozzle being restricted relative to the supply capacity of the supply conduit, a nozzle by-pass conduit connecting said water supply conduit to said delivery pipe to discharge longitudinally thereof substantially parallel to and with the direction of flow therein, the combined capacity of the nozzle and the by-pass being substantially less than the capacity of the delivery pipe whereby agitating circulation is maintained within the tank.

7. In a fertilizer distributor, the combination of a closable tank adapted to receive fertilizing material, of an outlet pipe projecting centrally into the tank from the bottom thereof, said outlet pipe being open at its upper end and having vertically spaced side openings, a delivery pipe connected to the lower end of the outlet pipe, a water supply conduit, a nozzle connected to said water supply conduit and positioned to deliver within said tank adjacent its bottom and tangentially of its side walls, a nozzle by-pass conduit connecting said water supply conduit to said delivery pipe to discharge longitudinally thereof, and a baffle disposed at the top of the tank to project inwardly from the side wall thereof with its inner side edge adjacent to the upper end of the outlet pipe but spaced therefrom, and its lower edge projecting below the same to direct the whirling water at the top of the tank toward the outlet pipe, the combined capacity of the nozzles and the by-pass being substantially less than the capacity of the delivery pipe whereby agitating circulation is maintained within the tank.

VERNON R. MacFEE.

REFERENCES CITED

The following references are of record in the file of this patent:

UNITED STATES PATENTS

| Number | Name | Date |
| --- | --- | --- |
| 1,498,327 | Rowell | June 17, 1924 |
| 2,242,789 | McFee | May 20, 1941 |
| 2,375,729 | Caldwell | May 8, 1945 |